United States Patent
Kao et al.

(10) Patent No.: US 12,368,814 B2
(45) Date of Patent: Jul. 22, 2025

(54) SYSTEM AND METHOD TO MEASURE OPTICAL BOKEH OF CAMERAS OF INFORMATION HANDLING SYSTEMS

(71) Applicant: Dell Products L.P., Round Rock, TX (US)

(72) Inventors: Chih Hao Kao, Taiwan (TW); Yong Kim, Singapore (SG); Yi Hsien Lin, Taiwan (TW)

(73) Assignee: Dell Products L.P., Round Rock, TX (US)

( * ) Notice: Subject to any disclaimer, the term of this patent is extended or adjusted under 35 U.S.C. 154(b) by 145 days.

(21) Appl. No.: 18/373,327

(22) Filed: Sep. 27, 2023

(65) Prior Publication Data

US 2025/0106346 A1 Mar. 27, 2025

(51) Int. Cl.
*H04N 5/262* (2006.01)
*G06T 7/80* (2017.01)

(52) U.S. Cl.
CPC ............. *H04N 5/2621* (2013.01); *G06T 7/80* (2017.01); *G06T 2207/10004* (2013.01)

(58) Field of Classification Search
CPC ................... H04N 5/2621; G06T 7/80; G06T 2207/10004
See application file for complete search history.

(56) References Cited

U.S. PATENT DOCUMENTS

| | | | |
|---|---|---|---|
| 9,129,369 B1* | 9/2015 | Wayne | G06T 5/73 |
| 9,646,365 B1* | 5/2017 | Hinkel | G06T 5/73 |
| 11,954,836 B2* | 4/2024 | Chen | G06T 5/20 |
| 2011/0150349 A1* | 6/2011 | Kojima | G06V 40/161 |
| | | | 382/224 |
| 2014/0160325 A1* | 6/2014 | Hirai | G06T 5/20 |
| | | | 348/252 |
| 2014/0247981 A1* | 9/2014 | Kusaka | G06V 10/44 |
| | | | 382/165 |
| 2014/0368494 A1* | 12/2014 | Sakharnykh | G06T 5/10 |
| | | | 345/419 |
| 2020/0166807 A1* | 5/2020 | Sasaki | G02F 1/133606 |
| 2021/0250517 A1* | 8/2021 | Mashimo | H04N 23/635 |
| 2024/0177274 A1* | 5/2024 | Scharam | G06T 5/50 |
| 2024/0207974 A1* | 6/2024 | Murphy | B23K 26/0648 |

* cited by examiner

*Primary Examiner* — Chiawei Chen
(74) *Attorney, Agent, or Firm* — Terrile, Cannatti & Chambers, LLP; Emmanuel A. Rivera (57) ABSTRACT

Described are methods and systems that determine bokeh ratio of a camera, such as a webcam in an information handling system. A focal point and bokeh point are determined for the camera. An image of a Siemens star chart (star chart) is captured by the camera at the bokeh point. The diameter of the captured image of the star chart and diameter of blur circle in the image of the star chart are measured. The ratio of the diameter of the blur circle to the diameter of the captured image of the star chart is correlated to the bokeh ratio of the camera.

20 Claims, 7 Drawing Sheets

SYSTEM AND METHOD TO MEASURE OPTICAL BOKEH OF CAMERAS OF INFORMATION HANDLING SYSTEMS

BACKGROUND OF THE INVENTION

Field of the Invention

The present invention relates to information handling systems. More specifically, embodiments of the invention measure optical bokeh of cameras integrated or connected to an information handling system.

Description of the Related Art

As the value and use of information continues to increase, individuals and businesses seek additional ways to process and store information. One option available to users is information handling systems. Information handling systems include personal computers (PC), server computers, desktop computers, notebooks, laptops, etc. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such a notebooks and laptops, make use of integrated or connected cameras, including web cameras. Such cameras are used to capture images and video, such as video during web conferencing. Cameras produce an effect known as optical bokeh or bokeh. In certain instances, it may be desirable to focus on a subject and blur the background. Bokeh provides for a subject to be in focus, and a soft out of focus or blurred background. Bokeh allows a subject to visually stand out from the background.

The degree of the blurred background depends on the amount of bokeh. Generally, the greater the bokeh, the greater the blurred background. Focus depth of field is lower the greater the bokeh. In other words, the greater the bokeh, with a subject in focus the depth of field is lower with a more blurred background. Bokeh becomes greater when a lens of a camera has larger aperture openings or smaller "f stops."

Although bokeh is well understood, quantifying and standardizing the amount of or degree of bokeh is not readily available. In particular, there is a desire to be able to quantify or standardize bokeh in order to compare or measure bokeh for and between cameras (e.g., webcams) implemented by information handling systems.

SUMMARY OF THE INVENTION

A computer-implementable method, system and computer-readable storage medium for determining bokeh ratio of an information handling system camera comprising determining a focal point of the camera; determining a bokeh point based on the focal point; capturing an image by the camera of a star chart at the bokeh point; measuring a diameter of the image of the star chart and a diameter of a blur circle of the star chart; and calculating a ratio of the diameter of the blur circle to the diameter of the image of the star chart, wherein the calculated ratio is the bokeh ratio.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Implementations described herein provide for determining optical bokeh or bokeh of a camera/webcam of an information handling system. A determination is performed as to a focus point and bokeh point of the camera/webcam based on aperture or lens size of the camera/webcam. A star chart image is taken by the camera/webcam at the bokeh point. The capture image includes the total image of the start chart with a blur circle. Diameters of the total image and the blur circle are determined, and a ratio is taken based on blur circle diameter to total image diameter.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
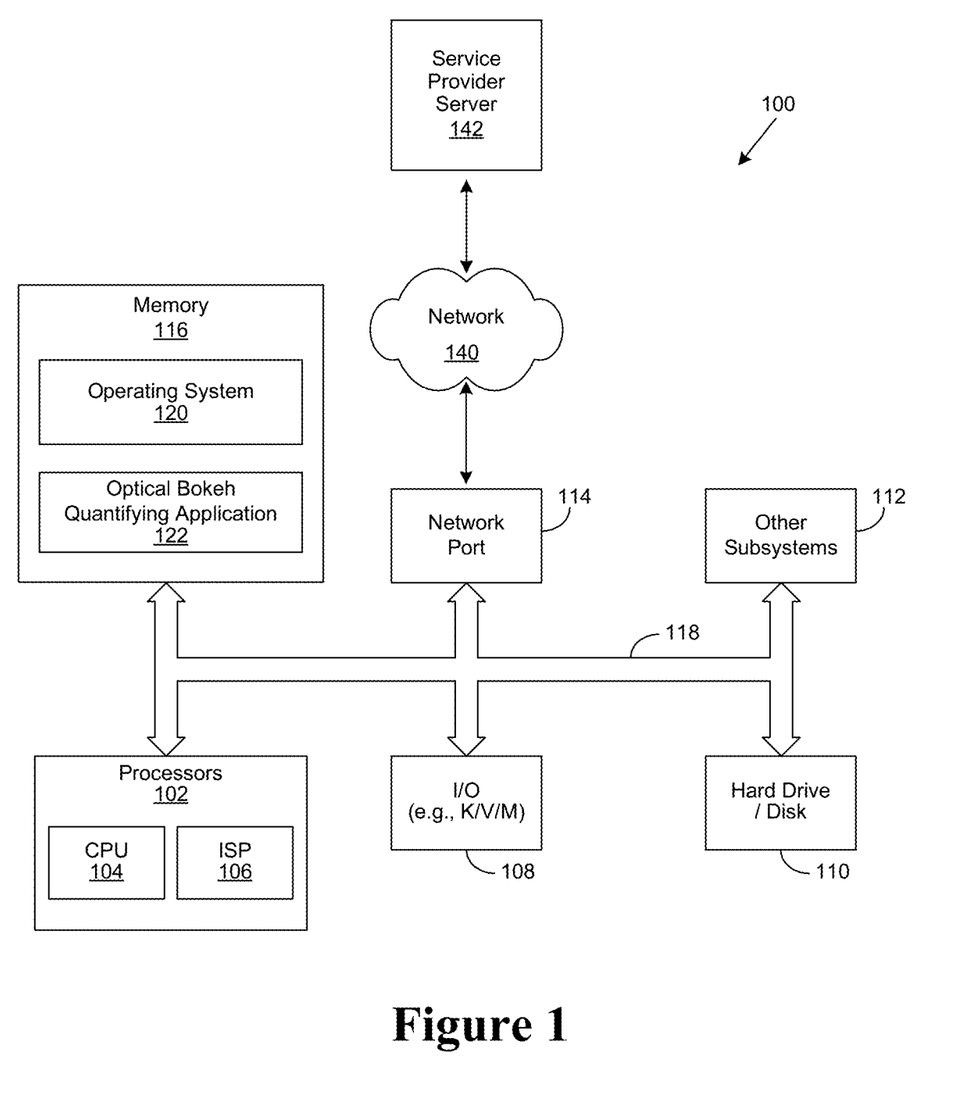
FIG. 1 is a general illustration of components of an information handling system as implemented in the present invention.

FIG. 1 is a generalized illustration of an information handling system 100. The information handling system 100 can be implemented as a computer, such as a desktop, server, tablet, laptop, or notebook, etc. The information handling system 100 includes processor(s) 102, such as a central processor unit or "CPU" 104 and an image signal processor or "ISP" 106. The information handling system 100 further includes input/output (I/O) devices 108, such as a microphone, a keyboard, a video/display, a mouse, and associated controllers (e.g., K/V/M), a hard drive or disk storage 110, and various other subsystems 112.

Various implementations provide for the I/O devices 108 to be external peripheral devices, such as keyboards, webcams, monitors, displays, etc. In particular, I/O devices 104 can include cameras, such as web cameras, as further described herein.

Implementations provide for such external devices are connected using cables based on standards such as universal serial bus (USB), including USB Type C. In certain, implementations, cameras, such web cameras described herein are external devices that are connected by the cables implementing standards, such as USB. Webcam can be the internal device as well such as embedded into a display or laptop.

In various embodiments, the information handling system 100 also includes network port 114 operable to connect to a network 140, where network 140 can include one or more wired and wireless networks, including the Internet. Network 140 is likewise accessible by a service provider server 142. The information handling system 100 likewise includes system memory 116, which is interconnected to the foregoing via one or more buses 118. System memory 116 can be implemented as hardware, firmware, software, or a combination of such. System memory 116 further includes an operating system (OS) 120.

Embodiments provide for the system memory 116 to include an optical bokeh quantification application 122. In various implementations, parameter settings are sent to the ISP 106 for execution. The various processes described herein are performed by the optical bokeh or bokeh quantification application 122. Implementations provide for the optical bokeh quantification application 122 to perform processes described herein.

Figure 2:
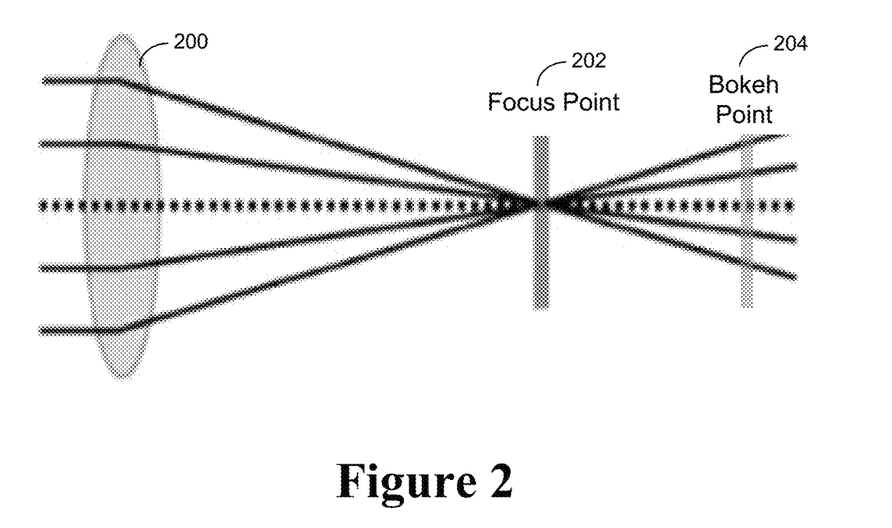
FIG. 2 illustrates focus point and optical bokeh or bokeh point.

FIG. 2 illustrates focus point and optical bokeh or bokeh point. A camera (e.g., webcam) includes a lens 200. A focus point 202 is a distance or point of an object from the camera (i.e., lens 200), where the camera (i.e., lens 200) focuses on. Beyond the focus point there will be some degree of blur or out of focus of an image. Optical bokeh or bokeh effect is proportional to distance to an optical bokeh or bokeh point 204.

Figure 3:
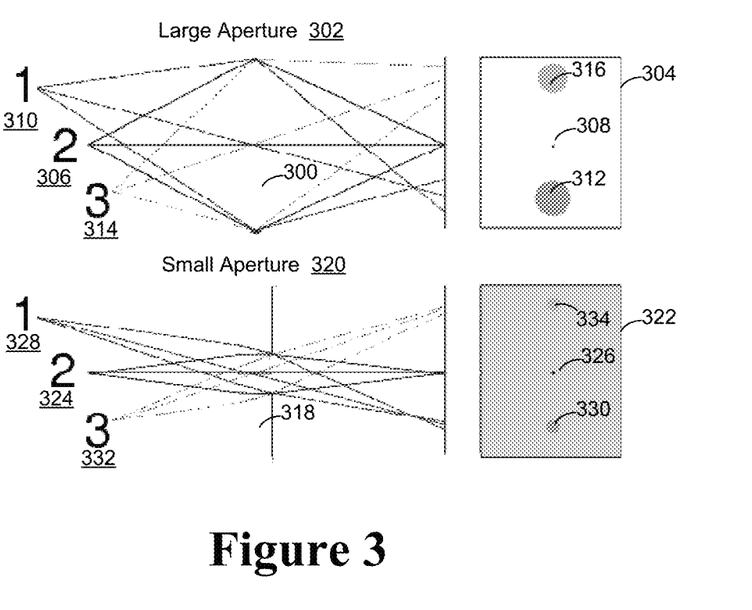
FIG. 3 illustrates lens aperture and optical bokeh or bokeh.

FIG. 3 illustrates lens aperture and bokeh. A lens 300 has a relatively large lens aperture 302. 304 represents focused images from the lens 300. Light from 2 306 passes through lens 300 and an in focus image 308 is seen in 304. Light from 1 310 passes through lens 300 and a blurred or out of focus image 312 is seen in 304. Light from 3 314 passes through lens 300 and a blurred or out of focus image 316 is seen in 304.

In comparison, a lens 318 has relatively small lens aperture 320. 322 represents focused images from the lens 318. Light from 2 324 passes through lens 318 and an in focus image 326 is seen in 322. Light from 1 328 passes through lens 318 and an in focus image 330 is seen in 322. Light from 3 332 passes through lens 318 and an in focus image 334 is seen in 322. The images 304 and 322 show that there is a greater bokeh effect with the lens 300 having a relatively large lens aperture 302 compared to the lens 318 having a relatively small lens aperture 320.

FIGS. 2 and 3 show that the focus point and bokeh point can be related geometric triangles, where focus point and bokeh point are defined. Optical bokeh or bokeh is shown to be proportional to a distance with the optical bokeh or bokeh point.

Figure 4:
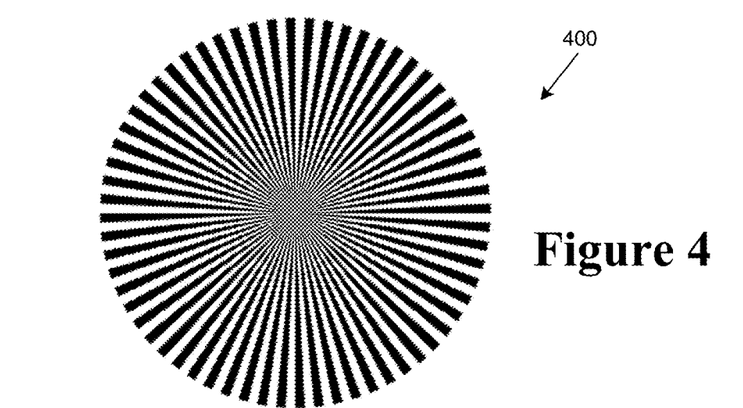
FIG. 4 illustrates a Siemens star chart.

FIG. 4 illustrates a Siemens star chart. The Siemens star chart or star chart 400 includes alternating black and white lines that converge from edge to the center of the star chart 400 (i.e., circle). In various implementations, the star chart 400 is viewed under an optical blur from defocus, where spurious resolution occurs above a resolution limit. Such a phenomenon creates an inverted polarity of the stripe pattern (i.e., alternating black and white lines) of the star chart 400. Black stripes appear in place of white stripes and vice versa. Further polarity inversions occur further inward of the star chart 400. Such an optical phenomenon takes place without the use of pixelated images, and is similar to aliasing. A "shimmering ring" around the center of the star chart 400 can appear, which changes size with viewing distance.

Figure 5:
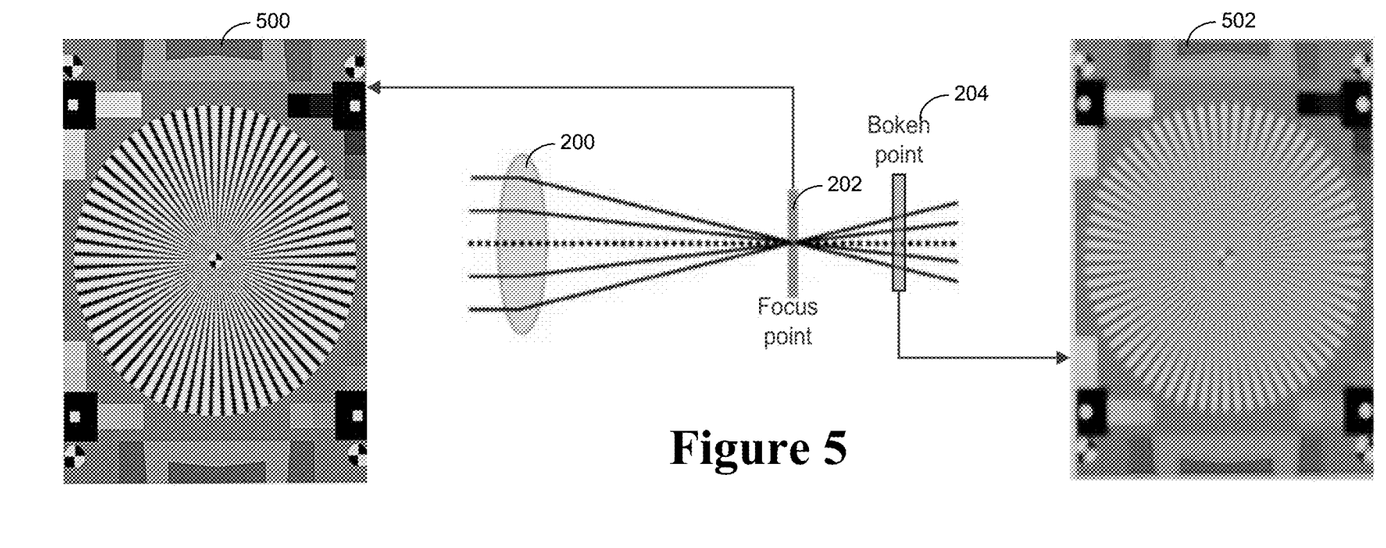
FIG. 5 illustrates star chart images at a focus point and a bokeh point.

FIG. 5 illustrates star chart images at a focus point and a bokeh point. A star chart image 500 is taken at focus point 200, and a star chart image 502 is taken at bokeh point 204. When a camera focus on focus point 200, a Moiré effect occurs. The Moiré effect is a mechanical interference of light by superimposed networks of lines (e.g., star chart alternating black and white lines). For cameras (e.g., webcams), the Moiré effect occurs as image resolution approaches camera sensor pitches. An image (e.g., star chart image 502) is seen at out of focus point(s). Size of the image (e.g., star chart image 502) depends on lens 200 properties (e.g., aperture) and bokeh point 204 position.

Figure 6:
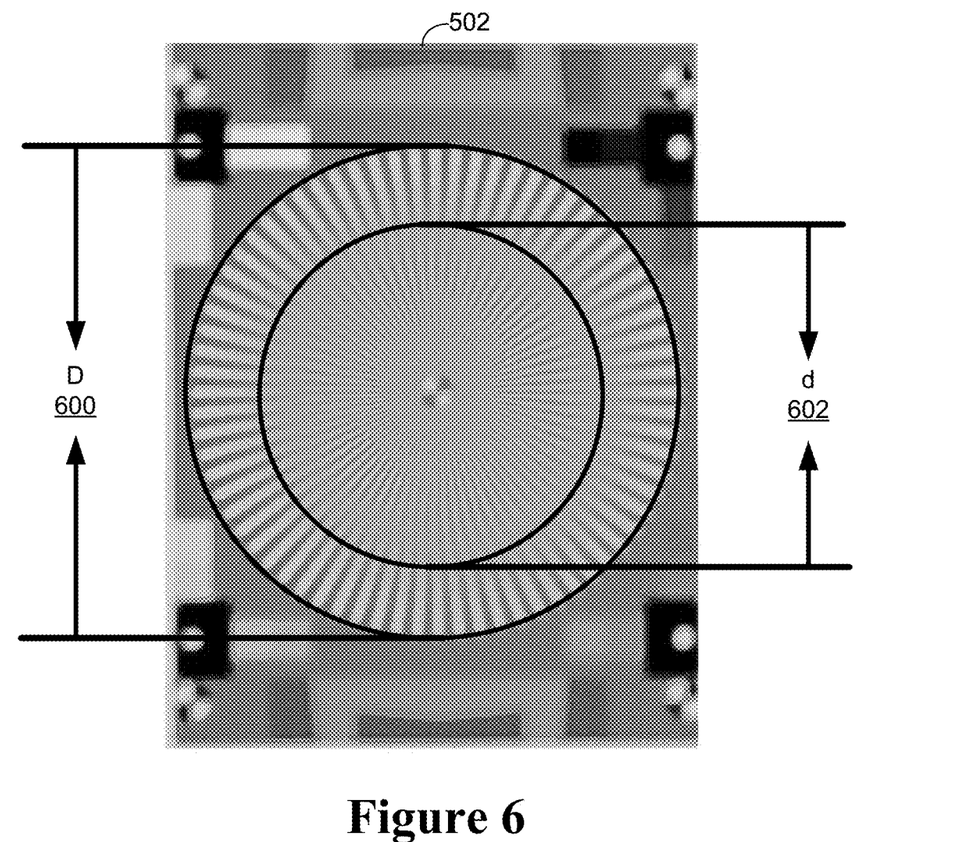
FIG. 6 illustrates optical bokeh or bokeh ratio.

FIG. 6 illustrates bokeh ratio. The image 502 shows a star chart diameter D 600 and a blur diameter d 602. The diameter D 600 and diameter d 602 are measured in pixels/pixel count. A bokeh ratio is defined by the following equation (1):

$$\text{Bokeh Ratio} = \text{Blur Diameter}(d\,602)/\text{Chart Diameter}(D\,600) \quad \text{equation (1)}$$

Referring back to FIG. 5, for example, with a webcam use of around 0.5 m to 0.8 cm, the webcam takes a picture of image 500, where the image 500 is 0.6 m from the webcam (i.e., lens 200) at focus point 202. The image 500 is considered as a foreground image. For example, the webcam takes a picture of image 502, where the image 502 is 3.0 m from the webcam (i.e., lens 200) at bokeh point 204. The image 502 is considered as a background image. The image 500 and image 502 are standardized star chart (i.e., same/standardized size).

For example, the webcam (i.e., lens 200) focuses at 0.6 m (i.e., focus point 202) to the focus point 202. Moiré effect normally occurs with pictures taken of image 500. As the webcam (i.e., lens 200) focuses at 0.6 m (i.e., focus point 202), the image 502 becomes blurred. A picture is taken of the image 502.

Referring now to FIG. 6, bokeh ratio is taken based on the picture of image 502. In various implementations, diameters D 600 and d 602 are measured in pixels/pixel count. In other words, bokeh ratio is star chart blur diameter d 602 in pixel count divided by star chart diameter D 600 in pixel count. Bokeh ratio value can be an objective value that depends on webcam/camera hardware configuration (e.g., lens, image sensor). Bokeh ratio can be performed using the optical bokeh or bokeh quantification application 122 described in FIG. 1.

In certain implementations, blur circle boundary to determine bokeh ratio can be determined by calculating contrast of black and white stripes of a star chart. This can be implemented through a software/firmware algorithm, such as used in optical bokeh or bokeh quantification application 122 described in FIG. 1.

Figure 7:
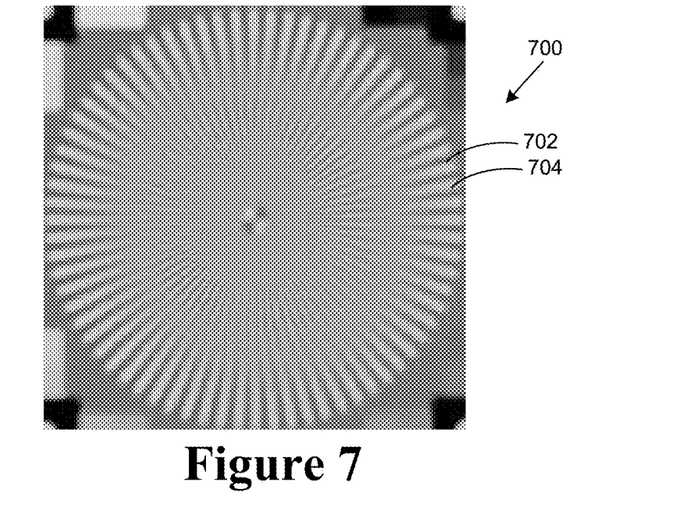
FIG. 7 illustrates a star chart with contrasting ratios of black and white stripes.

FIG. 7 shows a star chart 700 with contrasting ratios of black and white stripes, or black gray level and white gray level. In particular, the star chart 700 includes black gray level represented as 702, and white grey level represented as 704. Contrast ratio can be determined by (black gray level-white grey level)/(black gray level+white grey level). A contrast ratio value can be defined as threshold value used to plot circle boundary of the threshold. For example, such a threshold is a contrast value less than 0.3. The 0.3 ratio is a low limit for a user to tell the difference between white and black of the image.

Figure 8:
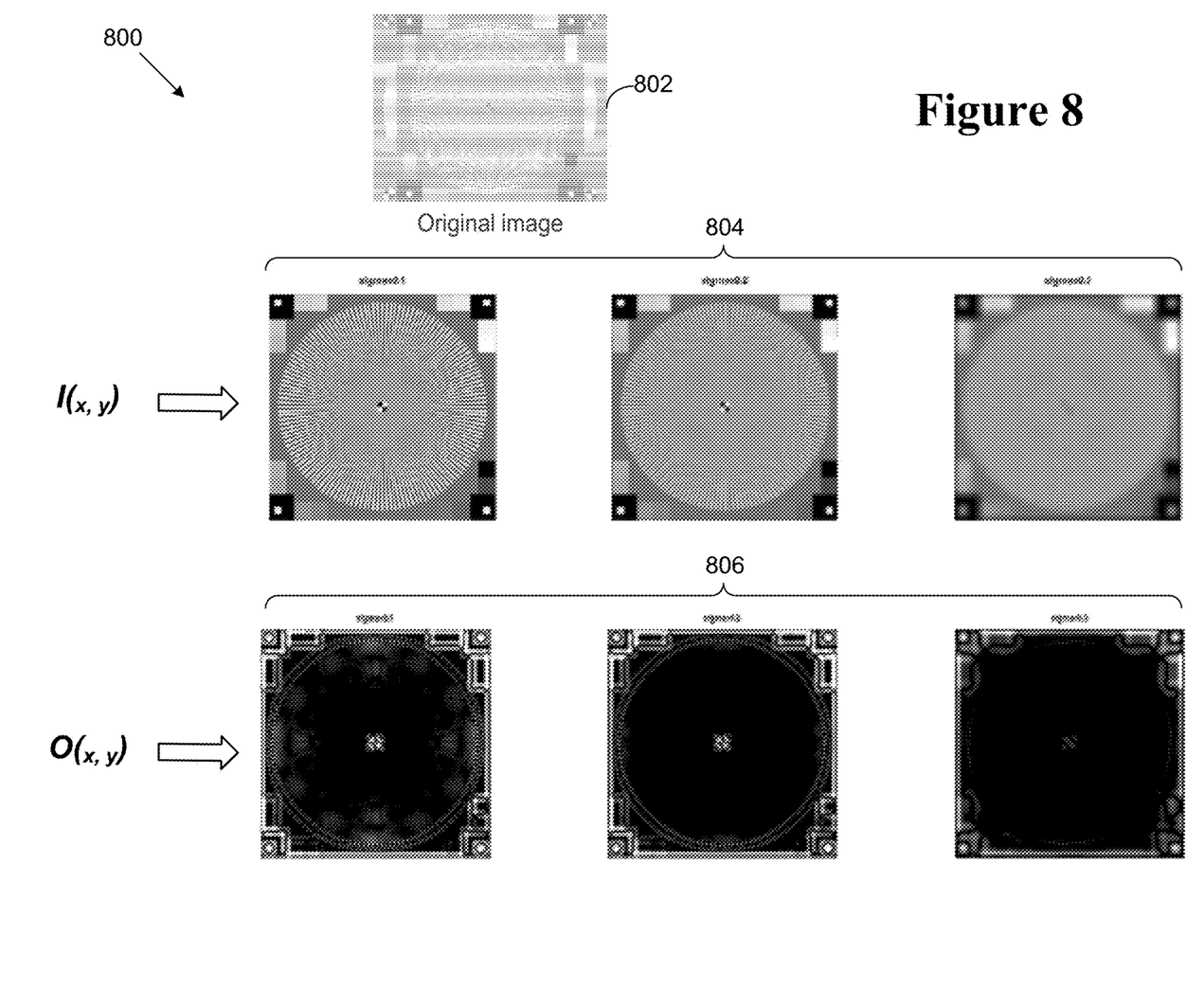
FIG. 8 illustrates measuring objectively bokeh using a captured image.

In certain implementations, bokeh can be measured objectively. FIG. 8 illustrates measuring objectively bokeh using captured image. FIG. 8 includes various images 800. In particular, an original image 802 that is taken by a camera (e.g., webcam), input images (pictures) $I_{(x, y)}$ 804, and output images $O_{(x, y)}$ 806. The output images 806 can be derived by the following Difference of Gaussians (DoG) equation (2), where (x, y) defines pixel coordinates. In other words, the equation is determined per pixel of input and output images.

$$O_{(x,y)} = I_{(x,y)} * (G_1 - G_2) \qquad \text{equation (2)}$$

where $$G_1 = \frac{1}{2\pi\sigma^2} e^{\frac{-(x^2+y^2)}{2\sigma^2}}$$

$$G_2 = \frac{1}{2\pi K^2 \sigma^2} e^{\frac{-(x^2+y^2)}{2K^2\sigma^2}}$$

In such implementations, a determination is performed as to the blur diameter in the background of a star chart image, an input image 804. As bokeh effect becomes stronger or more pronounced, spatial frequency representing bokeh effect becomes smaller. DoG is applied to an input image 804 per pixel as defined in the equation (1). DoG being ($G_1-G_2$). DoG is an enhancement algorithm that subtracts a Gaussian blurred version of an original image from another, less blurred version of the original image. For grayscale images, the blurred images are obtained by convolving the original grayscale images with Gaussian kernels (K) having differing standard deviations ($\sigma$). DoG represents how much blur occupies the background/background circle. Implementations can include a DoG filter in a camera/webcam of an information handling system such as IHS 100 described in FIG. 1. Implementations provide for optical bokeh or bokeh quantification application 122 of the HIS 100 to detect a smoothed area in spatial domain.

Figure 9:
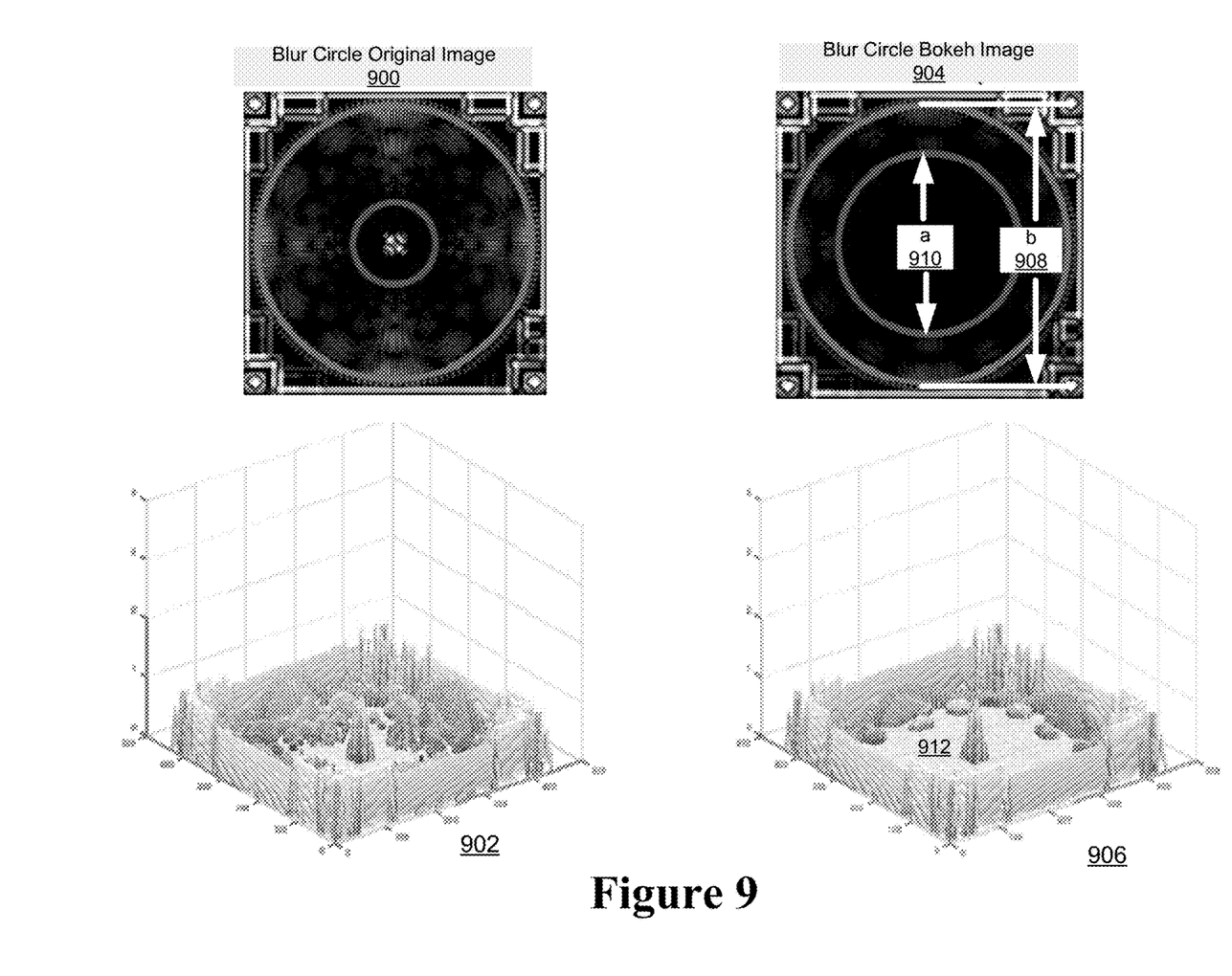
FIG. 9 illustrates Difference of Gaussian (DoG) filtering of star chart images.

FIG. 9 illustrates Difference of Gaussian (DoG) filtering of star chart images. An output image (e.g., output images $O_{(x, y)}$ 806) of original image 802 is represented as blur circle original image 900. The blur circle original image 900 is the original image 802 after applying DoG filtering. 902 is a 3D histogram representing pixel values of the blur circle original image 900.

An output image (e.g., output images $O_{(x, y)}$ 806) of an input $I_{(x, y)}$ 804 is represented as blur circle bokeh image 904. The blur circle bokeh image 904 is an input $I_{(x, y)}$ 804 after applying DoG filtering. 906 is a 3D histogram representing pixel values of the blur circle bokeh image 904.

The diameter star chart input image of blur circle bokeh image 904 is represented by a diameter b 908, which is measured in pixels/pixel count. The diameter of blur or bokeh of blur circle bokeh image 904 is represented by a diameter a 910, which is measured in pixels/pixel count. In the 3D histogram 906, the area 912 represents the area of blur or bokeh of blur circle bokeh image 904. The area 912 is clipped to 0 inches in linear space. Bokeh ratio is determined by the ratio of a 910 to b 908 (i.e., a/b).

Figure 10:
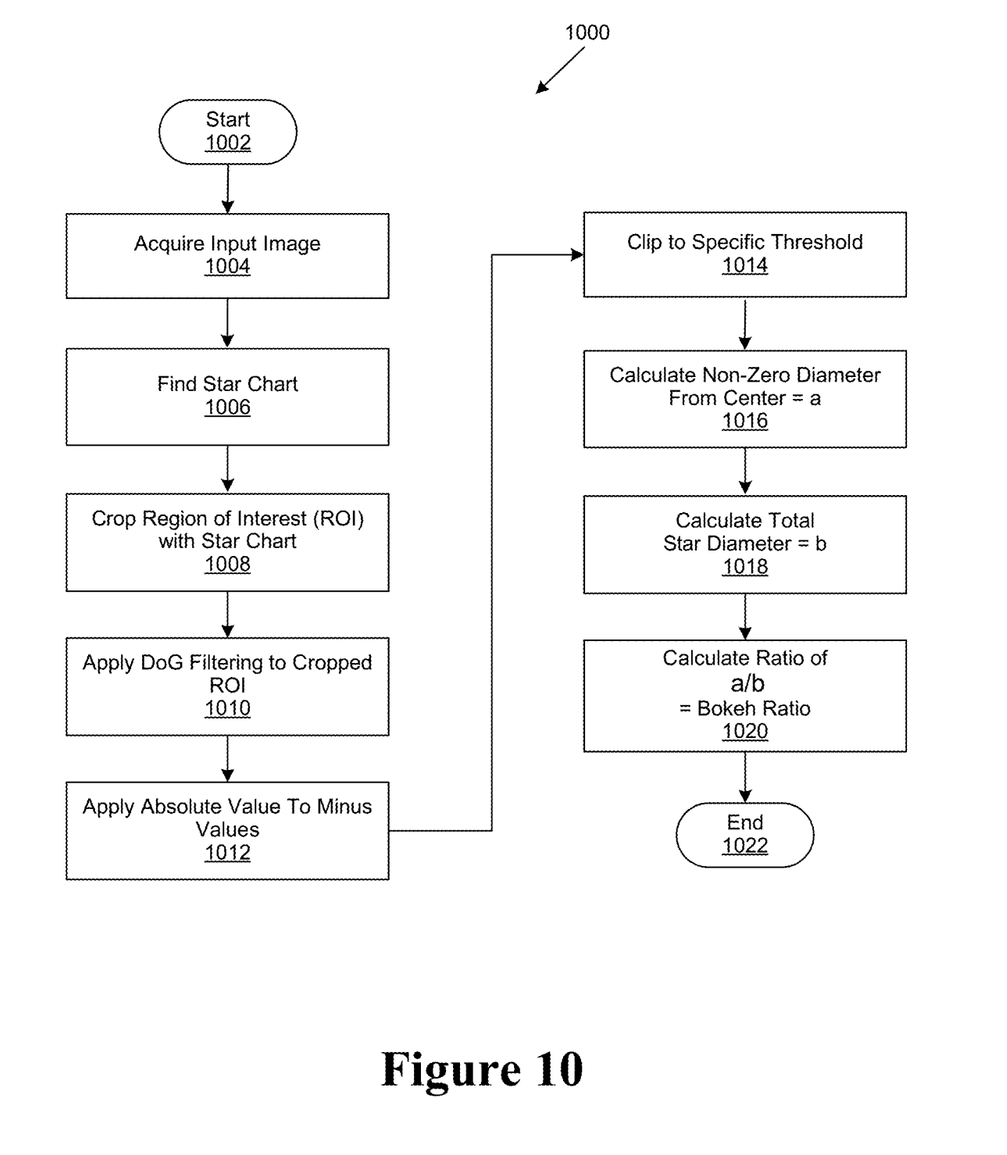
FIG. 10 is a generalized flowchart for objectively measuring optical bokeh or bokeh.

FIG. 10 is a generalized flowchart for objectively measuring optical bokeh or bokeh. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. In certain implementations, the optical bokeh quantification application 122 described in FIG. 1 can be used to perform steps of the described method/process.

At step 1002, the process 1000 starts. At step 1004, a camera (e.g., webcam) takes and acquires an image from a set distance (e.g., bokeh point 204). The image includes a star chart. At step 1006, the star chart in the image is found/determined. At the step 1008, the image is cropped as to a region of interest (ROI), where the ROI is the star chart.

At step 1010, DoG as described above in FIGS. 8 and 9, is applied to the ROI (i.e., star chart). At step 1012, absolute values are applied to pixel positions (x, y) that have negative values when DoG is applied. At step 1014, a threshold can be set to address any noise in the blur circle (i.e., DoG applied ROI/star chart).

At step 1016, the diameter of the blur circle of the DOG applied star chart is taken as described in FIG. 9, which is a 910. At step 1018, the diameter of the DOG applied star chart is taken as described in FIG. 9, which is diameter b 908. At step 1020, the objective bokeh ratio is determined. The bokeh ratio being the ratio of the diameter of the blur circle of the DOG applied star chart to the total diameter of the DOG applied star chart, or a/b. At step 1022, the process 1000 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram step or steps.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for determining bokeh ratio of an information handling system camera comprising:
   determining a focal point of the camera;
   determining a bokeh point based on the focal point;
   capturing an image by the camera of a star chart at the bokeh point;
   measuring a diameter of the image of the star chart and a diameter of a blur circle of the star chart; and
   calculating a ratio of the diameter of the blur circle to the diameter of the image of the star chart, wherein the calculated ratio is the bokeh ratio.

2. The computer-implementable method of claim 1, wherein aperture of the camera is considered in determining the focal point and the bokeh point.

3. The computer-implementable method of claim 1, wherein bokeh ratio depends on camera hardware configuration including lens configuration and sensor configuration.

4. The computer-implementable method of claim 1, wherein the diameter and boundary of the blur circle are determined by calculating contrast of black and white stripes of the star chart.

5. The computer-implementable method of claim 1, wherein the diameter of the image of the star chart and blur circle are measured in pixels.

6. The computer-implementable method of claim 1 further comprising applying a threshold value as to the image of the star chart and blur circle.

7. The computer-implementable method of claim 1 further comprising applying a Difference of Gaussian to the captured image.

8. An information handling system (IHS) comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations for determining bokeh ratio of the information handling system camera comprising instructions executable by the processor and configured for:
   determining a focal point of the camera;
   determining a bokeh point based on the focal point;
   capturing an image by the camera of a star chart at the bokeh point;
   measuring a diameter of the image of the star chart and a diameter of a blur circle of the star chart; and
   calculating a ratio of the diameter of the blur circle to the diameter of the image of the star chart, wherein the calculated ratio is the bokeh ratio.

9. The information handling system (IHS) of claim 8, wherein aperture of the camera is considered in determining the focal point and the bokeh point.

10. The information handling system (IHS) of claim 8, wherein bokeh ratio depends on camera hardware configuration including lens configuration and sensor configuration.

11. The information handling system (IHS) of claim 8, wherein the diameter and boundary of the blur circle are determined by calculating contrast of black and white stripes of the star chart.

12. The information handling system (IHS) of claim 8, wherein the diameter of the image of the star chart and blur circle are measured in pixels.

13. The information handling system (IHS) of claim 8 further comprising applying a threshold value as to the image of the star chart and blur circle.

14. The information handling system (IHS) of claim 8 further comprising applying a Difference of Gaussian to the captured image.

15. A non-transitory, computer-readable storage medium embodying computer program code for determining bokeh ratio of an information handling system camera, the computer program code comprising computer executable instructions configured for:
   determining a focal point of the camera;
   determining a bokeh point based on the focal point;
   capturing an image by the camera of a star chart at the bokeh point;
   measuring a diameter of the image of the star chart and a diameter of a blur circle of the star chart; and
   calculating a ratio of the diameter of the blur circle to the diameter of the image of the star chart, wherein the calculated ratio is the bokeh ratio.

16. The non-transitory, computer-readable storage medium of claim 15, wherein aperture of the camera is considered in determining the focal point and the bokeh point.

17. The non-transitory, computer-readable storage medium of claim 15, wherein bokeh ratio depends on camera hardware configuration including lens configuration and sensor configuration.

18. The non-transitory, computer-readable storage medium of claim 15, wherein the diameter and boundary of the blur circle are determined by calculating contrast of black and white stripes of the star chart.

19. The non-transitory, computer-readable storage medium of claim 15, wherein the diameter of the image of the star chart and blur circle are measured in pixels.

20. The non-transitory, computer-readable storage medium of claim 15 further comprising applying a Difference of Gaussian to the captured image.

* * * * *